Jan. 14, 1947. F. SALZMANN 2,414,170
METHOD FOR THE REGULATION OF THE OUTPUT OF THERMAL POWER PLANTS
Filed Dec. 8, 1942 3 Sheets-Sheet 3

Inventor
Fritz Salzmann
By Dodge and Son
Attorneys

Patented Jan. 14, 1947

2,414,170

UNITED STATES PATENT OFFICE 2,414,170

METHOD FOR THE REGULATION OF THE OUTPUT OF THERMAL POWER PLANTS

Fritz Salzmann, Zurich, Switzerland, assignor to Aktiengesellschaft für Technische Studien, Zurich, Switzerland, a corporation of Switzerland Application December 8, 1942, Serial No. 468,263
In Switzerland December 10, 1941

7 Claims. (Cl. 60—59)

This invention relates to a method for the regulation of the output of thermal power plants, in which at least the greater part of a gaseous working medium, preferably air, describes a cycle, is raised in at least one compressor to a higher pressure, then heated by a supply of heat from an external source and afterwards expanded in at least one turbine.

The object of the present invention is to provide a method of this kind which will render the regulating operation rapidly effective when variations occur in the load and also permit of the provision of the devices required for regulation at points of the cycle at which low temperatures, even if not the lowest temperature which can ever occur in the cycle, prevail. According to the present invention these advantages are secured by varying, at least when fluctuations in the load on the plant between no-load and normal load occur, a quantity of working medium which, after compression, at least to a partial extent, flows back as a short circuit current and without performing any work, into the cycle to a point thereon at which the pressure is lower. If, when this method of regulation is employed, the short circuit current be increased for example, the result will be that the pressure on the exhaust side of the compressor will drop, which in its turn will cause a diminution in the output of the turbine. On the other hand the pressure on the suction side of the compressor and concomitantly therewith the back pressure at the outlet end of the turbine, will rise which likewise will conduce to a diminution of the output of the turbine. In addition to this, owing to the increase in the suction pressure of the compressor the amount of energy absorbed by this latter will be increased. Since, however, the amount of useful output developed given up externally by the plant results in each case as the difference of power between the output of the turbine and the amount of power absorbed by the compressor, the simultaneous reduction in the output of the turbine and the increase in the amount of power absorbed by the compressor effects a particularly rapid drop in the useful output given up by the plant. In other words, the result is then the aforesaid rapid response characteristic of the new method of regulation.

Various constructional forms of plants for carrying out the new method are shown by way of example in the accompanying drawings in a partially simplified mode of representation.

Figure 1:
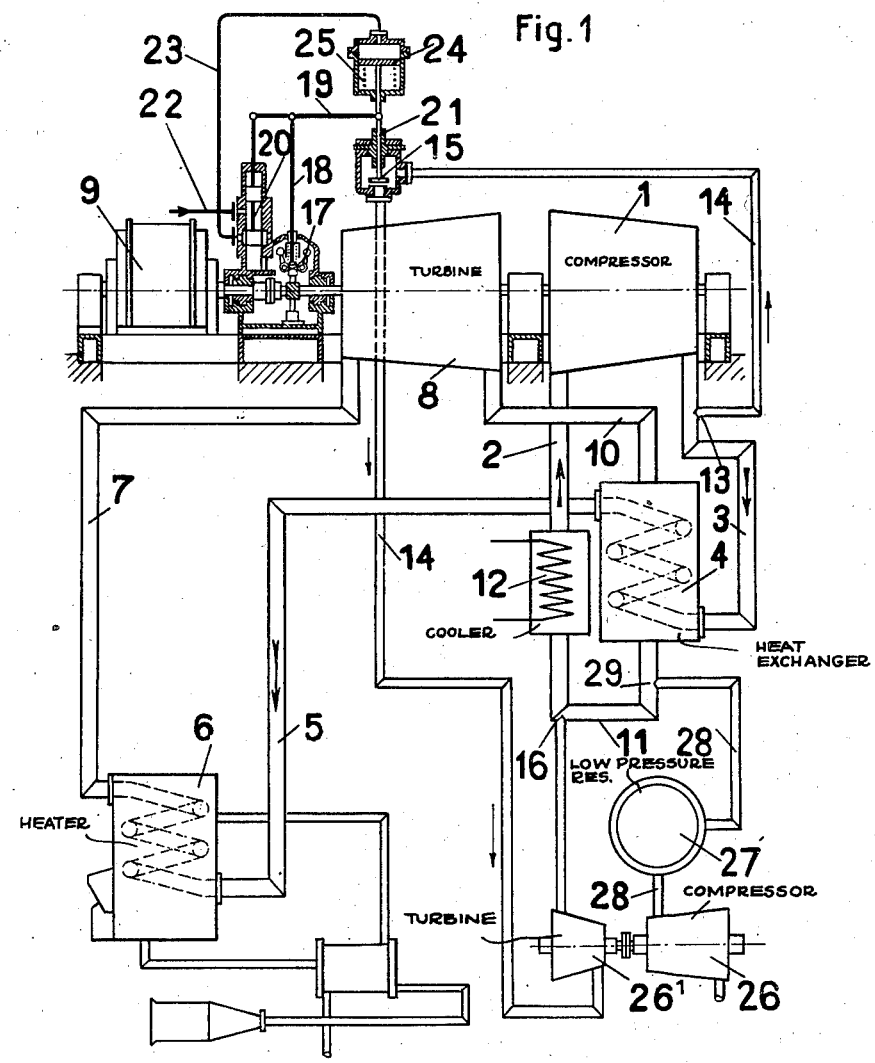
Fig. 1 shows a plant in which a short circuit current can take place from a point immediately behind the compressor to a point on the cycle which is situated in front of a cooler interposed in the suction pipe of the compressor.

In Fig. 1, 1 denotes a compressor to which a working medium, which is to be compressed and the greater part of which describes a closed cycle, is supplied through a pipe 2. The working medium which is raised in this compressor 1 to a higher pressure, passes through a pipe 3 into a heat exchanger 4, in which it takes up heat and then passes through a pipe 5 into a heater 6, in which heat is supplied to said medium from an external source. The working medium raised to a higher temperature in this way then flows through a pipe 7 to a turbine 8, in which, while giving up power to the compressor 1 and, for example, to a generator 9, it expands, after which it flows through a pipe 10 to the heat exchanger 4. In this latter the expanded hot part of the working medium gives up heat to the comparatively cold part of the working medium coming from the compressor 1, after which the part first mentioned passes through a pipe 11 into a cooler 12 and out of it into the suction pipe 2 of the compressor 1, the closed circuit of the plant being thus completed.

Beyond the compressor 1, in the direction in which the working medium flows, a bypass or short circuit pipe 14, into which is built a self-adjusting valve 15, branches off from the pipe 3 at the point 13. The pipe 14 opens at the point 16 ahead of the cooler 12 into the pipe 11 of the circuit which has been further described above.

The automatic adjustment of the valve 15 is initiated in each case by a speed governor 17 of the thermal power plant which is connected by a rod 18 to a beam 19 to which a controlling valve 20 is linked on the left and the spindle 21 of the valve 15 on the right. The valve 20 controls the admission of oil under pressure from a pipe 22 into a pipe 23, which opens into a chamber above a piston 24. A spring 25 acts from below on this piston 24 which is rigidly connected to the valve spindle 21.

The regulating arrangement described works in the following way: If for example a drop in the load on the plant takes place, the result is an increase in the speed so that the speed governor 17 lifts the valve 20, whereby the oil above the piston 24 flows away through the pipe 23 until the piston 24 and with it the valve 15 have risen to such a height under the action of the spring 25 that so large a quantity of working medium can flow through the short circuit pipe 14 from the point 13 to the point 16 on the cycle that the amount of energy developed by the plant is in equilibrium again with the amount of energy consumed. The restoring of the regulating arrangement is effected in the well known way over the beam 19.

An increase in the load on the plant results in a drop in the speed of the machines 1 and 8, which causes a downward movement of the controlling valve 20 and consequently an admission of oil under pressure from the pipe 22 into the pipe 23, so that the piston 24 and the valve 15 are moved in the direction in which they close against the pressure of the spring 25.

The regulating operations described take place without any variation in the total quantity of working medium contained in the cycle, which quantity must correspond, when the valve 15 is closed, to the maximum output demanded of the plant. In order to fill up the cycle and to cover any losses by leakage which may occur, an auxiliary compressor 26, which is connected by a pipe 28 and a storage reservoir 27 to the point 29 on the cycle is employed.

The regulating arrangement described has only one valve 15 which comes into contact with the working medium. The part in question of the working medium is however at a comparatively low temperature, because nearly the lowest temperature occurring in the whole of the cycle prevails at the point 13 at which the short circuit pipe 14 branches off from the cycle. Any jeopardisation of the regulating valve 15 by too high a temperature is consequently not to be feared.

The regulating arrangement may be constructed in such a way that under the most frequently occurring load, that is to say under the normal load on the plant, the valve 15 is already closed. In such case working medium only flows through the short circuit pipe 14 when the load falls below the normal load. Increases in the load above the normal load cannot be compensated by the regulating arrangement in such a case. However, on the other hand, such a construction of the regulating arrangement affords the great advantage that under normal load conditions no working medium at all flows through the pipe 14, so that also the loss in useful energy connected with such an additional flow and with the flow through a regulating device is entirely avoided.

If on the other hand the regulating arrangement is to be capable of compensating both a load which exceeds the normal load and also one which falls below it, the conditions must be selected in such a way that the valve 15 allows, even when the load on the plant is normal, a certain quantity of working material to flow through the short circuit pipe 14. In such a case a part of the working medium raised to a higher pressure by the compressor 1 flows almost without interruption through the pipe 14 to a point where the pressure is lower, without performing any work in the turbine 8. The compressor is consequently compelled to circulate practically continuously a larger quantity of working medium than is utilised in the turbine 8 for the performance of work. In such a case the quantity of working medium flowing normally through the short circuit pipe can still be utilised, in order to generate useful energy. In the embodiment illustrated in Fig. 1 this working medium is utilised to drive an air turbine $26^1$ actuating the compressor 26 for charging the storage reservoir 27; it may also be used to compensate losses due to leakage which occur in the cycle, etc. If the valve 15 be opened to a sufficient extent it can even be attained that the whole of the power developed by the turbine is consumed by the compressor 1 and that the useful output of the plant drops to zero.

The point of low pressure at which the outlet end of the short circuit pipe opens into the cycle may be situated at any point between the outlet branch of the turbine 8 and the suction branch of the compressor 1.

The regulating method of the kind described can be, according to the demands made on the power plant, carried out by itself alone or in conjunction with other regulating methods.

Figure 2:
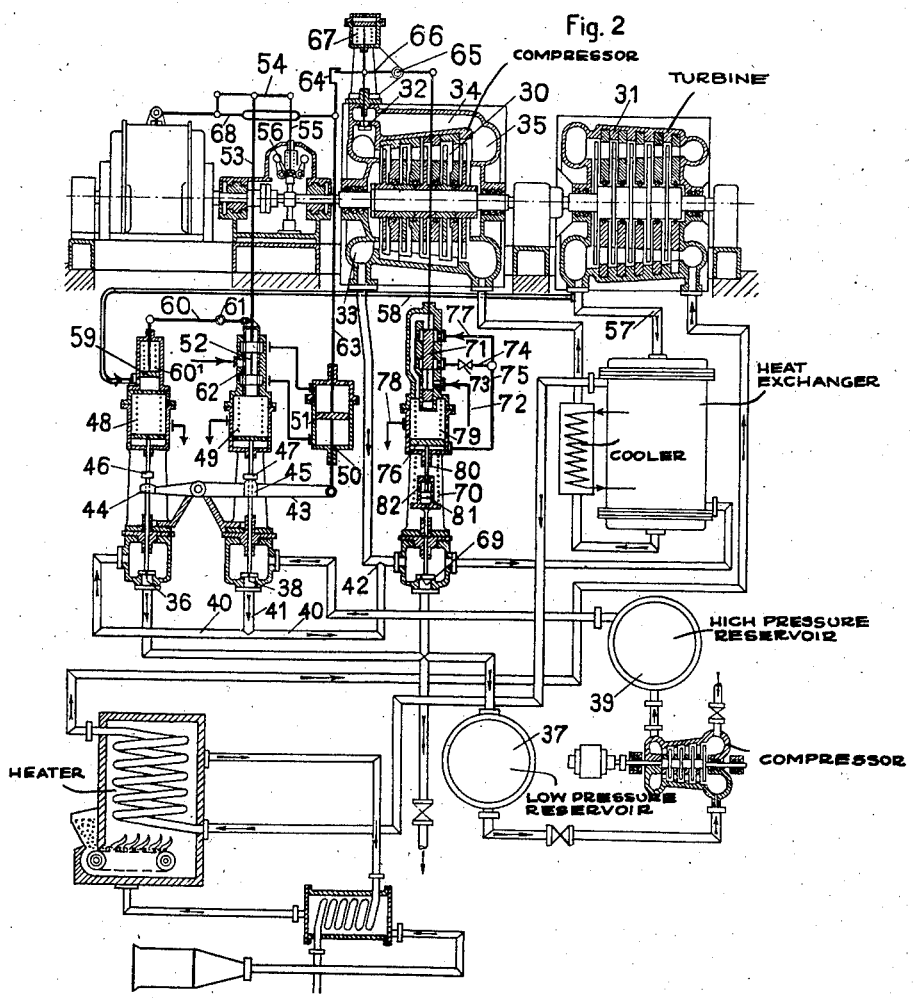
Fig. 2 shows a plant which enables the new method to be used in conjunction with means for varying the level of pressure in the working medium cycle and Fig. 3 shows a plant which permits the new method to be used in conjunction with means for varying the level of pressure in the working medium cycle and also with means for covering losses by leakage in said cycle.

Thus for example, Fig. 2 shows a plant in which the method according to the present invention is used for the compensation of slighter fluctuations in the load which extend over a short period of time, whereas for variations in the load which are greater and last longer, the level of the pressure in the cycle, i. e. the amount of working medium therein is varied.

In Fig. 2, 30 denotes the compressor and 31 the turbine of the plant. 32 is a self-adjusting valve which permits of influencing a short circuit current of working medium which may flow from the high pressure chamber 33 of the compressor 30 through a passage 34 provided in the latter to the suction chamber 35 of the compressor 30. 36 denotes a valve, which controls the discharge of working medium from the cycle to a low pressure reservoir 37, and 38 is a valve which controls the admission of working medium from a high pressure reservoir 39 to the cycle. The chambers of the valves 36 and 38 are connected by pipes 40 and 41 to the point 42 on the cycle of the working medium. The valves 36 and 38 are operated by a lever 43, having cams 44 and 45, through the stops 46 and 47 respectively which are mounted on the valve spindles. The valves 36 and 38 are loaded by the pressure of springs 48 and 49 respectively. The lever 43 is operated by a rod 50 from a servomotor piston 51. The admission of oil under pressure above or below this piston 51 is controlled by a valve 52 which can be operated by means of a system of rods 53, 54 and 55 from a centrifugal governor 56.

To a pipe 57, which is connected to the exhaust branch of the turbine 31 and forms a component of the normal cycle of the plant traversed by the working medium, is connected a pipe 58, which opens into the space or chamber below a piston 59. The pressure which exists below this piston 59 is counterbalanced by the force of a spring $60^1$. The piston 59 is pivoted to a lever 60 adapted to oscillate about a point 61, and by means of which any movement of the piston 59 is transmitted to a sleeve 62 which surrounds the slide valve 52. The servo-motor piston 51 is also connected on its upper side to a rod 63, which, by means of a fork 64 and a rod 66 adapted to turn about a point 65, operates the valve 32, which is normally kept closed by a spring 67. To the rod 63 is also connected a restoring rod 68.

Connected up in parallel with the above mentioned outlet valve 36 is a further, and as a rule smaller, valve 69, which is normally held in the closed position by a spring 70. This valve 69 is controlled by a slide valve 71, which in its turn is linked to the beam 66 which operates the valve 32. The slide valve 71 controls the admission of oil under pressure from a pipe 72 through a pipe 74, provided with a hand adjustable throttling cock 73, and a pipe 75 to the underside of a piston 76, and the discharge of the oil thence through pipes 75, 77 and 78. The piston 76 is forced downwards by a spring 79, and a rod 80 rigidly connected thereto carries on its lower end a tappet 81, which is displaceable freely within a certain range in a sleeve 82 connected to the disc of the valve 69.

The different arrangements described with reference to Fig. 2 work as follows: Under a normal state of equilibrium between the power generated and that consumed, the valves 36, 38 and 69 are closed. The valve 32 is likewise closed or at least nearly so. As soon however as load is taken off the plant, the speed of the machines 30 and 31 rises at once so that the rod 55 is raised by the centrifugal governor 56. This causes the valve 52 to rise, by which the admission of oil under pressure is controlled in such a way that the piston 51 is caused to move downwards. When this happens the downward movement of the fork 64 causes at first only an opening of the valve 32, so that part of the working medium can flow from the high pressure chamber 33 of the compressor 30 through the passage 34 directly over into the suction chamber 35 of the compressor, that is to say, without performing any work in the turbine. When only a slight load is taken off the plant, a slight opening of the valve 32 suffices already to bring about the required equilibrium between the energy generated and that consumed. When more load is taken off the plant, the speed of the machines 30 and 31 rises still further, so that then the servomotor piston 51 is forced downwards until the cam 44 on the lever 43 reaches the stop 46 and raises the exhaust valve 36. Owing to a discharge of working medium from the cycle which is connected with this, the level of pressure therein is lowered, which causes a reduction in the amount of energy given off. The discharge of working medium through the valve 36 continues until, in consequence of a drop in the speed, a movement of the controlling valve 52 in the opposite direction is brought about. As a result of the latter the piston 51 is raised to such an extent that the valve 36 is again closed by spring pressure, the valve 32 returning at the same time to a nearly closed position which is possible owing to the upward movement of the fork 64 which has taken place.

The second discharge valve 69 is for the purpose of allowing the level of pressure in the cycle to be lowered by a discharge of working medium through the valve 69 even when the valve 32 is opened only slightly, that is to say on a slight downward movement of the piston 51, on the occurrence of which the cam 44 on the lever 43 does not yet reach the stop 46 so that therefore the valve 36 is not yet raised. Such a drop of the pressure in the cycle should however take place only slowly, that is to say only after the drop in load which has been impressed on the plant proves to be one extending over a longer time. This is attained in the following way: Even when the valve 32 is opened slightly the slide valve 71 linked to the right hand end of the lever 66 is moved upwards and thereby releases the admission of oil under pressure through the throttling point 73 and the pipe 75 into the chamber under the piston 76, so that this latter moves upwards at a speed controllable by means of the throttling point 73 and against the action exerted by the spring 79. The valve 69 is raised as soon as the tappet 81 has passed through the free play in the sleeve 82. Discharge of working medium through the valve 69 now takes place until in consequence of the falling off of the power given off by the plant the speed drops to such an extent that the valve 32 is closed again or nearly so. The slide valve 71 is moved downwards, so that the oil under the piston 76 can run off through the pipe 75 and the unthrottled pipe 77, and both the piston 76 and also the valve 69 are moved into the closed position by the springs 79 and 70 respectively.

If an increase in load, which exceeds the amount of power obtainable with the level of pressure prevailing in the plant at the moment, takes place when the valve 32 is closed, the piston 51 will be moved upwards beyond the position shown in Fig. 2 owing to the drop in the speed of the machines. During this time the valve 32 remains unacted upon in the closed position, while the inlet valve 38 is raised now by the cam 45 of the lever 43 and the stop 47 so that working medium is supplied to the cycle from the accumulator 39 and the pressure in the cycle consequently increased. Admission of working medium in this way continues until the amount of power given off by the plant has been reached and the speed begins to rise again. The amount of working medium to be admitted is in this case, in order to act more rapidly, as indicated, preferably supplied to the high pressure side of the cycle, as it is then practically instantly utilised in the turbine 31 for the performance of work.

A restoring of the controlling mechanisms by the level of pressure in the cycle is effected in the usual way owing to the fact that the connecting pipe 58 transmits the pressure in the cycle to the spring-loaded piston 59, the movement of which produces a positive displacement of the sleeve 62 which is provided with controlling slots and surrounds the controlling valve 52.

In a plant as shown in Fig. 2 fluctuations in the load which oscillate over a range of output lying between the maximum output corresponding to the quantity of working medium in the cycle at the moment and an output lying a certain fractional part below this output, are therefore compensated with the help of the short circuit current flowing through the passage 34, while greater fluctuations in the load are compensated to the amount by which they exceed that range of output by a temporary admission of working medium to the cycle or by withdrawal of such therefrom.

If labyrinth stuffing boxes of the usual kind are used for packing the shaft at the turbine casing, then, if the pressure in the cycle is greater than atmospheric pressure, a certain quantity of working medium, which as a rule will be only small, will constantly escape through these stuffing boxes due to leakage. In order however to be able to maintain a certain level of pressure in the cycle notwithstanding this, a certain quantity of working medium has consequently to be supplied permanently to the cycle, which is preferably effected through a special valve in the low pressure part. When the supply of the required quantity of working medium is made in this way, energy for compression is saved. The supply of working medium to increase the level of the pressure for the purpose of augmenting the amount of output developed by the plant is effected on the other hand, as already stated, preferably in the high pressure part of the cycle, as in this case the energy of the working medium which is to be supplied and is stored in a high pressure reservoir, can be used immediately for supplying energy to the turbine. As a short circuit flow of working medium from a point at a high pressure to a point at a lower pressure on the cycle is sufficient for the compensation of rapid drops in the load, it suffices, therefore, in the case of a prolonged drop in the load, to shut off the supply of working medium intended to cover any loss due to leakage, for a subsequent transition to a lower level of pressure in the cycle.

Figure 3:
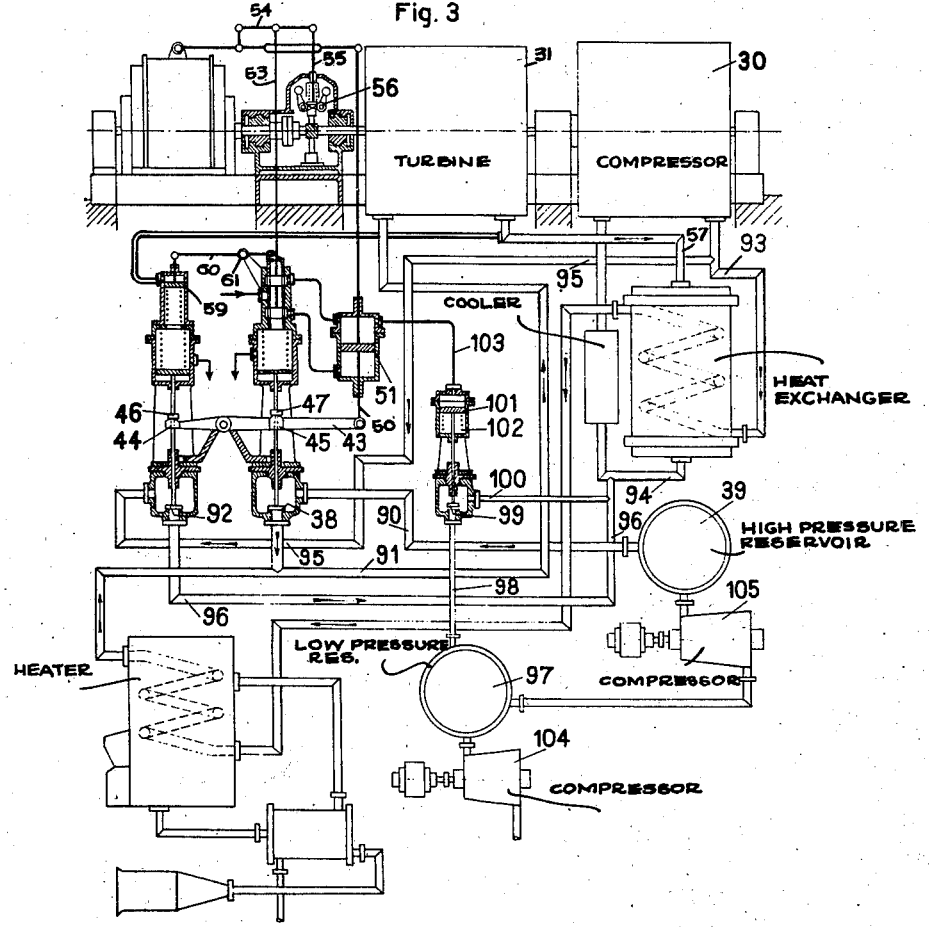

In Fig. 3 is shown a plant in which regulations of this kind can be carried out. Many parts in this figure correspond to those which have already been described in conjunction with Fig. 2, and in order therefore to simplify the description those parts in Fig. 3 which correspond to those in Fig. 2 are denoted by the same reference symbols as in Fig. 2.

In the plant shown in Fig. 3 a centrifugal governor 56 allotted to its machines again acts on a servomotor piston 51, from which a beam 43 with the two cams 44 and 45 is operated, the cam 44 serves, as in the case of Fig. 2, to operate a valve 38 for the admission of working medium. This valve 38 which is operated by means of the stop 47 controls the admission of working medium from the pressure reservoir 39 through a pipe 90 into a pipe 91 belonging to the high pressure part of the cycle. A valve 92 operated by the cam 44 through the stop 46 controls on the other hand the direct flow of working medium from the pipe 93 of the cycle connected to the high pressure part of the compressor 30 to the pipe 94, in which a lower pressure exists than in the pipe 93, said short circuit current flowing through the pipes 95 and 96. The losses in the plant due to leakage are compensated by the supply of working medium from a reservoir 97. The pressure in this latter is lower than the pressure in the reservoir 39. The supply of working medium from the reservoir 97 to the cycle takes place through a pipe 98, a valve 99, a pipe 100 and a part of the pipe 96. The valve 99 is connected to a piston 101, on which a spring 102 exerts a force which tends to move the valve 99 in the direction in which it opens. The space above the piston 101 is connected by a pipe 103 to the space above the piston 51 of the main servomotor. 104 and 105 denote auxiliary compressors, which maintain the necessary storage pressures in the reservoirs 97 and 39. These compressors 104 and 105 are arranged in series.

When the output of the plant is in equilibrium the valves 92 and 38 are closed, the valve 99 is, on the contrary, open to such an extent that it allows the quantity of working medium required to cover the losses at the stuffing boxes by leakage to pass. When the load on the plant drops and the speed of the machine therefore rises, oil under pressure is admitted above the piston 51 in the manner described in conjunction with Fig. 2, and the piston 51 then moves downwards, so that the beam 43 is rocked and lifts, by means of the cam 44 and stop 46, the valve 92 against the pressure of a spring, whereby the flow of working medium from the pipe 93 into the pipe 94 through the short circuit connection 95, 92, 96 is permitted and the efficiency of the output of the plant is therefore reduced. The pressure produced above the piston 51 is simultaneously propagated through the pipe 103 into the space above the piston 101, so that the valve 99 is closed against the action of the spring 102. The losses in the plant due to leakage are no longer covered, so that the level of pressure prevailing in the cycle gradually drops, with the result, that the output developed in the plant drops still further. This continues until the governor 56 has again closed the valve 92 and also until the piston 51 has returned to the original position due to the oil under pressure above it running away. During this time the valve 99 has been raised again by the action of the spring 102, so that it permits of the flow from the reservoir of the quantity of working medium necessary for the normal covering of the losses due to leakage.

Compensation of an increase in the load on the plant is effected in the same way as that described in conjunction with Fig. 2, the inlet valve 38 being then raised so as to admit working medium to the cycle. The valve 99 does not take any part in this regulating operation.

In the plants shown in Figs. 2 and 3, when decreases in the load take place, as much working medium is taken from the cycle with temporal delay as is necessary to convert the working conditions with a short circuit current from a point at a higher pressure to a point at a lower pressure on the cycle into a working condition without any such short circuit current, but with diminished density of the working medium for the same output of the plant. In the case of Fig. 3 a slow diminution of the density of the quantity of working medium contained in the cycle is brought about by cutting off the supply of working medium required to cover the losses in the plant due to leakage.

What is claimed is:

1. Method for the regulation of the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises by-passing a quantity of working medium after at least partial compression thereof in the compressor to a point in the circuit at which the pressure is lower and without performing work in the turbine; and varying the quantity so by-passed in relation to fluctuations of load on the plant between no load and normal load.

2. Method for the regulation of the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises by-passing a quantity of working medium after at least partial compression thereof in the compressor to the intake of the compressor and without performing work in the turbine; and varying the quantity so by-passed in relation to fluctuations of load on the plant between no load and normal load.

3. Method for the regulation of the output of thermal power plants, in which at least the greater part of a gaseous working medium, preferably air, describes a closed circuit in which it is raised, after having been previously cooled in a cooler, in at least one compressor to a higher pressure, then heated by a supply of heat from an external source and afterwards expanded in at least one turbine, which method comprises varying at least when fluctuations in the load on the plant between no-load and normal load occur, a quantity of working medium, which after having been at least partially compressed, flows back as a short circuit current and without performing any work in the turbine in front of said cooler into the suction pipe of said compressor.

4. Method for the regulation of the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises compensating fluctuations in load which oscillate within a range of load lying between the maximum corresponding to the quantity of working medium in the circuit at the moment and an output lying by a certain fractional part below this output, by varying a quantity of working medium, which after having been at least partially compressed, flows back as a short circuit current and without performing any work in the turbine to a point on the circuit at which the pressure is lower, and in compensating greater fluctuations in the load to the amount by which they exceed said range of load by a temporary admission of working medium into the circuit or withdrawal thereof therefrom.

5. Method for the regulation of the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises compensating fluctuations in load which oscillate within a range of load lying between the maximum corresponding to the quantity of working medium in the circuit at the moment and an output lying by a certain fractional part below this output, by varying a quantity of working medium, which after having been at least partially compressed, flows back as a short circuit current and without performing any work in the turbine to a point on the circuit at which the pressure is lower, in further compensating greater fluctuations in the load to the amount by which they exceed said range of load by a temporary admission of working medium into the circuit or withdrawal thereof therefrom, and in withdrawing with temporary delay so much working medium from the circuit as is necessary to convert the working condition with a short circuit current from a point at a high pressure to a point at a lower pressure of the circuit into a working condition without such a short circuit current, but with a reduced density of the working medium for the same output of the plant.

6. Method for the regulation of the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises compensating fluctuations in load which oscillate within a range of load lying between the maximum corresponding to the quantity of working medium in the circuit at the moment and an output lying by a certain fractional part below this output, by varying a quantity of working medium, which after having been at least partially compressed, flows back as a short circuit current and without performing any work in the turbine to a point on the circuit at which the pressure is lower, in further compensating greater fluctuations in the load to the amount by which they exceed said range of load by a temporary admission of working medium into the circuit or withdrawal thereof therefrom and in slowly reducing the density of the quantity of working medium contained in the circuit for the purpose of converting the working condition with a short circuit current from a point at a high pressure to a point at a lower pressure of the circuit into a working condition without such a short circuit current, but with a reduced density of the working medium for the same output of the plant, by cutting off the supply of working medium required for covering the losses in the plant due to leakage.

7. A method of regulating the output of thermal power plants, in which at least the greater part of a gaseous working medium, preferably air, describes a closed circuit in which it is raised in at least one compressor to a higher pressure, then heated by a supply of heat from an external source and afterwards expanded in at least one turbine, which method comprises by-passing a quantity of working medium after at least partial compression to a point in the circuit in which the pressure is lower without performing work in the turbine, applying the by-passed medium to the performance of work in the maintenance of the charge of medium in the circuit and varying the quantity of medium so by-passed in relation to fluctuations of load on the plant between no load and normal load.

FRITZ SALZMANN.